Sept. 2, 1941.　　　C. G. BROSTROM　　　2,254,350
ADHESIVE APPLYING MACHINE
Filed March 25, 1940　　　3 Sheets-Sheet 1

INVENTOR
Charles G. Brostrom
By his attorney
Victor Cobb

Sept. 2, 1941.   C. G. BROSTROM   2,254,350
ADHESIVE APPLYING MACHINE
Filed March 25, 1940   3 Sheets-Sheet 2
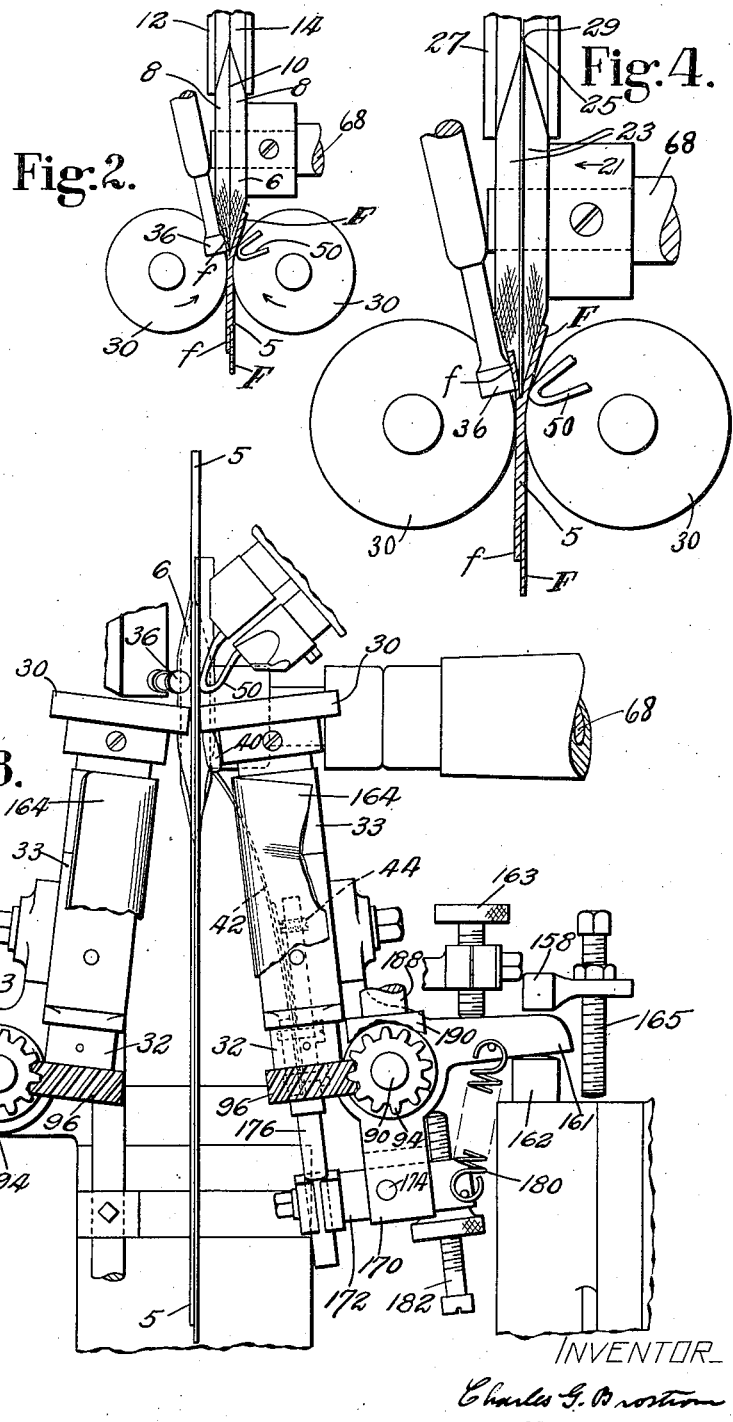

Patented Sept. 2, 1941

2,254,350

UNITED STATES PATENT OFFICE 2,254,350

ADHESIVE APPLYING MACHINE

Charles G. Brostrom, Salem, Mass., assignor to United Shoe Machinery Corporation, Borough of Flemington, N. J., a corporation of New Jersey Application March 25, 1940, Serial No. 325,675

34 Claims. (Cl. 12—17)

This invention relates to adhesive-applying machines and is illustrated as embodied in a machine for applying adhesive substances to the channel of a sole. It is to be understood, however, that the invention and various important features thereof may have other applications and uses.

It is an object of the invention to apply an adhesive to a channeled sole and simultaneously therewith so to condition one of the flaps that it will diverge from the other to insure that such flap will not be prematurely attached by adhesion to the sole. It is a further object of the invention to provide an adhesive applying machine of general utility in the application of adhesive material to channeled work pieces having flaps or extensions of equal or unequal width.

An important feature of the invention resides in the provision of means for treating a channeled work piece, having a flap or extension at one side of the channel, in such manner that such flap or extension will bend or curl away from the other side of the channel. As illustrated, such work-treating means is embodied in a tool for searing a channeled leather sole along a line adjacent to the root of the channel to cause shrinking of the leather substance along said line whereby said flap or extension is caused to bend away from the adjacent part of the sole. Preferably, and as shown, work feeding means is provided to present the work piece to said searing tool and to means operative simultaneously therewith to apply adhesive to the channeled portion of the work piece. Conveniently, the searing of one of the flaps is accomplished by an electrically heated tool pressed against the sole while adhesive is being applied to the inner contiguous surfaces of the channel.

In the illustrated machine, the adhesive applying tool is somewhat disk shaped with two frusto-conical surfaces making a wedge shaped periphery adapted to enter more or less deeply between spaced flaring portions of a work piece or into a groove or channel of a work piece such as a channeled insole. A feature of importance resides in the provision of means for keeping such a work piece pressed firmly against the wedge shaped peripheral surface of the adhesive applying tool in such manner that the tool is entered to the full depth of the channel or other similar space, while other means progresses the work piece relatively to said tool at a constant rate to secure uniform application of the adhesive material to one or both of the inner contiguous surfaces of those portions which define the channel or space. In a preferred construction, said pressing means comprises two presser rolls arranged to engage opposite surfaces of the work piece and driven to rotate toward the axis of a rotary adhesive applying tool, the presser rolls engaging the work piece, conveniently at one side of the channeled or otherwise divided portion thereof, and operating by frictional contact to hold the work piece against the applying roll.

In a work piece, such as that shown in Fig. 6 of United States Letters Patent No. 2,131,838, granted October 4, 1938, upon application of J. P. Fredericksen, wherein one channel flap is wider than the other, or in which both flaps are wider than usual, it is important that such a flap be held with sufficient pressure against the adhesive carrying side surface of the applying tool to secure the desired application of adhesive to such flap. For this purpose there is provided, in the illustrated machine, a flat presser member preferably of a yielding character, such as a spring finger, which holds an extended and more or less flexible flap against the adhesive carrying surface of the applying tool.

These and other important features and novel combinations of parts will now be described in detail in the specification and then pointed out more particularly in the appended claims.

In the drawings,

Fig. 2 is a detail view of the work engaging tools with a work piece undergoing treatment;

Fig. 3 is also a detail view of the work engaging tools showing the driving means for the two co-operating rolls shown in plan view in Fig. 2;

Fig. 4 is a detail view of another form of adhesive applying tool; and

Figure 1:
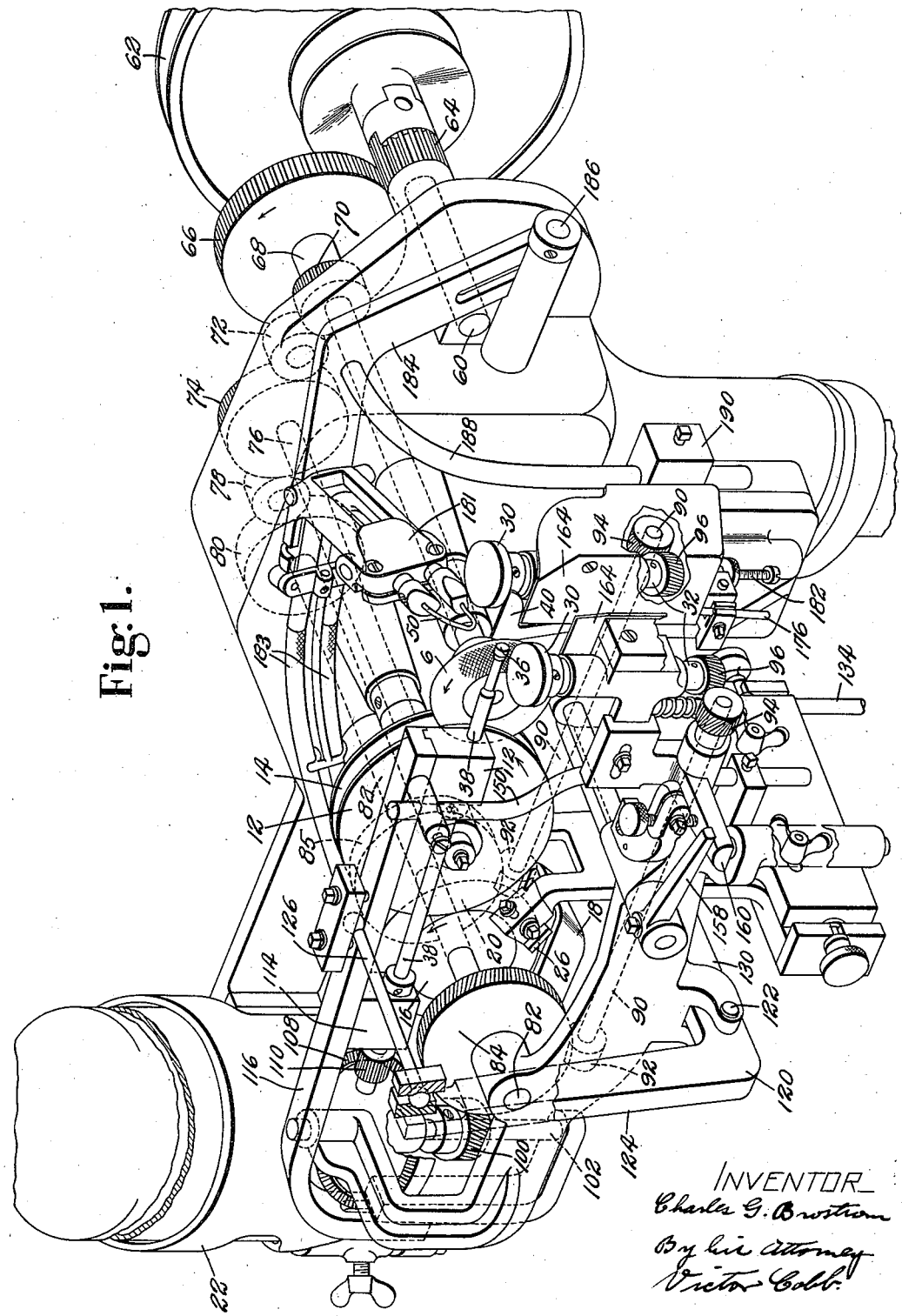
Fig. 1 is an angular projection of one illustrative embodiment of the invention.

In the illustrated construction, which is specially designed for the application of cement to the flaps of a channeled insole 5, there is provided a disk roll or tool 6 for applying cement to the inner contiguous surfaces of the flaps of a channeled insole. As shown most clearly in Fig. 2, the roll 6 comprises two frusto-conical portions 8 and is so shaped as to provide a sharp peripheral portion 10, the arrangement being such that the periphery of the disk 6 engages the root or apex portion of the channel. For supplying cement to the tool 6 there is provided a roll 12 (Figs. 1 and 2) having a grooved periphery, the slanting surfaces 14 of which are complemental to those of the tool 6 and are spaced from each other a suitable distance to apply cement to the conical surfaces of the tool 6. The roll 12 receives cement in its turn from a supply roll 16 (Fig. 1) which rotates in a trough 18, the said supply roll 16 having frusto-conical surfaces 20 suitable to supply cement to the slanting surfaces 14 of the roll 12. Located above the trough 18 at one end thereof is a receptacle 22 adapted to receive a bottle or other container of cement, the arrangement being such that the bottle cap is removed and the bottle inverted into the trough 18. For regulating the amount of cement on the surfaces 20 of the supplying roll 16 there is provided a pair of wipers one for each surface 20, one of said wipers being shown at 26 (Fig. 1), the said wiper being adjustable by well-known means with respect to the surface 20 whereby the latter is permitted to carry only the desired amount of cement to the corresponding surface 14 on the roll 12.

In Fig. 4 of the drawings there is shown an adhesive applying tool 21 of a distinctly different construction from the tool 6, although it applies adhesive to the inner contiguous surfaces of a channeled member very much in the manner of the tool 6. This tool 21 comprises two frusto-conical members 23 applied to opposite surfaces of a central disk 25, the disk being of such a size and so arranged as to present an annular surface on each side thereof, which is not intended to carry adhesive material to the work piece. A shown, the tool 21 receives adhesive from a co-operating member 27 similar to the member 12 but having a central slot 29 therein for the reception of the projecting annular portion of the disk 25. To insure that no adhesive material is left on said annular surfaces of the disk 25, wiper members (not shown) are provided to keep such annular surfaces clear of adhesive. The purpose of this construction resides in the fact that in certain classes of work, it is desirable to apply no adhesive to the deepest part of the channel in the work piece. It will be understood that the width of the annular part of the disk 25 may be such as to apply no adhesive to the channel flaps at the deepest part of the channel for a width of perhaps $\frac{1}{16}''$ or even $\frac{1}{8}''$. Otherwise the tool 21 operates in the same manner as the tool 6 and has the work piece held against the periphery thereof by rotary presser members which will now be described in connection with said tool 6.

For keeping a channeled work piece, such as an insole, pressed against the wedge shaped surface of the tool 6, there is provided a pair of rotary presser members 30 which are normally spaced apart, as shown in Fig. 1, to permit the work piece to be placed by the operator in proper relation to the tool 6, that is, with the wedge shaped surface of the tool 6 pressed into the channel between the flaps of the work piece 5, the placing of the work piece in the position just described being facilitated by the action of the presser members 30 which the operator brings into operation by stepping on a treadle (not shown) substantially at the instant that the work piece has contacted the tool 6, as will hereinafter be more fully described. Since the presser members 30 are rotated in the direction of the arrows (Fig. 2) they tend constantly to force the work piece toward the operative surfaces of the tool 6, it being understood that while the rotary presser members 30 are positively driven by shafts 32 their surfaces are relatively smooth and, therefore, operate only frictionally to perform the function just described. It is to be noted, furthermore, that the members 30 are cylinders and that they engage the work piece along an edge portion of the cylindrical surface of each member. There is thus offered a minimum of resistance to the feeding means by which the work piece is fed along in a substantially straight line past the presser members 30 and then in an abruptly curving line, as around the toe portion of a channeled insole. As shown, the shafts 32 are rotatably mounted in supports 33 pivoted to turn about substantially horizontal pivot members, as will hereinafter be described.

In order to provide for feeding of the work piece 5 at a uniform rate past the tool 6, there is provided a feed roll 36 (Figs. 1, 2 and 3) at at the end of a power driven shaft 38. When the machine is in open position the feed roll 36 is spaced from the tool 6 and is moved into co-operative relation by treadle controlled means at substantially the same time that the rotary presser members 30 are moved to engage the work piece. The feed roll 36 rotates in a counterclockwise direction to feed the work piece in co-operation with the tool 6, as most clearly shown in Fig. 3 of the drawings. Incidentally, the feed roll 36 engages a flap of the work piece 5 in feeding the latter and, at the same time, presses it firmly against the adjacent surface of the tool 6, thereby insuring the application of adhesive material on said surface to the contacting surface of the flap.

Means is also provided for pressing the other flap against the adjacent surface of the tool 6, such means being especially desirable where the flap is wider than usual and, therefore, more likely to be flexible and to require a pressing means in order to hold it with the necessary pressure against the adhesive applying surface of the tool. In the construction shown, such pressing means comprises a spring finger or presser member 40 (Figs. 1 and 3) having a relatively broad surface to engage the larger flap of the work piece, said member being carried at the upper end of a flexible shank 42 adapted to be pressed upon by an adjustable set screw 44 to secure proper operation of the presser member 40. Said presser member is movable between work receiving and work pressing position to facilitate introduction of a work piece, as will hereinafter be described.

At the same time that a work piece, such as a leather insole 5, is being fed past the tool 6 to have cement applied thereto, a searing or other shrinking operation, which changes the minute structure of the leather, is performed on the larger flap adjacent to the root or apex portion of the channel in said insole, the purpose being to cause the larger flap to diverge from the smaller flap so that these two flaps will not adhere to each other at this stage of the operations on the insole. For the sealing operation there is provided an electrical tool 50 (Figs. 1, 2 and 3) adapted to be heated to a substantially white heat and positioned to contact with the insole along a line opposite to the apex of the channel in said insole thus shrinking the outer surface of the leather and causing the flap F to curl away from the opposed portion of the sole 5, here the other flap $f$. As will hereinafter be described, the tool 50 is also movable between a work receiving and a work treating position.

Upon reference to Fig. 1 of the drawings it will be observed that power is provided to drive a shaft 60 through a pulley 62 and that the said shaft carries a pinion 64 which is constantly in mesh with a gear 66 secured to a shaft 68 the other end of which has the tool 6 secured thereto to be driven thereby. Also secured to the shaft 68 is a pinion 70 constantly in mesh with a second pinion 72 mounted on a stub shaft in the frame of the machine, the said pinion 72 being also in mesh with a gear 74 fixedly carried by a shaft 76 which has secured to its opposite end the supply roll 12 to drive the latter. In mesh with the gear 74 is a small pinion 78 carried by a stub shaft in the frame of the machine and arranged to be constantly in mesh with a gear wheel 80 secured to a shaft 82 which carries at its opposite end a bevel gear 84 and at an intermediate point another similar bevel gear 85. Also secured to the shaft 82 is the supplying roll 16 which, as before described, rotates in the adhesive material in the trough 18 and applies a predetermined amount to the roll 12 and thence to the tool 6. It will be observed from this description of the driving means for the tool 6 and for the supplying rolls 12 and 16, that the tool 6 and rolls 12 and 16 are all rotating in the same direction and therefore that the adjacent peripheral surfaces of each pair of these rotary members are turning in opposite directions, thereby providing a wiping effect between the surfaces and tending to secure satisfactory transfer of the adhesive material from one to the other, respectively.

For driving the shafts 32 of the rotary presser members 30 there is provided in each case a substantially horizontal shaft 90 (Figs. 1 and 3) having at its rear end a bevel pinion 92 arranged to be constantly in mesh with one of the bevel gears 84 and 85 on the shaft 82. At its forward end each shaft 90 carries a bevel pinion 94 arranged to be constantly in mesh with a corresponding bevel gear 96 secured to the lower end of one of the shafts 32, whereby the rotary presser members 30 are constantly driven at the same rate while power is being supplied to the machine.

In the illustrated construction, power means for driving the shaft 38 of the feed roll 36 is derived indirectly from the bevel gear 84 (Fig. 1) on the shaft 82, the train of gears comprising a bevel pinion 100 constantly in mesh with the bevel gear 84, said pinion 100 being secured to a shaft 102, which also carries fixedly secured thereto a bevel gear 108 arranged in mesh with a bevel pinion 110 secured to the shaft 38, the arrangement being such that the feed roll 36 is driven constantly in an anti-clockwise direction while power is supplied to the machine.

In order that the feed roll 36 may be moved between work receiving and work feeding positions, the shaft 38 is mounted in blocks 112 and 114 (Fig. 1) carried by a substantially horizontal arm 116 of a lever which is pivoted on the upper end of the shaft 102. For swinging the arm 116 about its pivot 102 there is provided a bell crank lever 120 (Figs. 1 and 5) pivoted at 122 on the frame of the machine and having its upright arm 124 connected by a link 126 to the arm 116, each end of the link 126 having formed thereon a ball for reception in a socket provided respectively in the arm 116 and in the upper end of the arm 124. As shown, the bell crank 120 has a substantially horizontal arm 130, the far end of which is slotted as at 132 (Fig. 5) to receive slidably the upper end of a treadle rod 134. Between a collar 136 adjustably secured to the rod 134 and the lower surface of the slotted end of the arm 130 is a spring 138 which yieldingly presses said slotted end of the arm 130 against a collar 140 also adjustably secured to said rod 134, the arrangement being such that, upon releasing the treadle (not shown), the rod 134 is moved in an upward direction by a spring 142, whereby the slotted end of the bell crank lever 120 is moved upwardly through operation of the spring 138, with the result that the upright arm 124 of the bell crank lever is tipped to the left in Figs. 1 and 5, such movement of the bell crank lever having the effect of moving the lever arm 116 and hence the shaft 38 in a direction to carry the feeding roll 36 away from the tool 6. To limit the movement of the arm 116 and therefore of the shaft 38 and feed roll 36 in a direction away from the tool 6, there is provided an upright rod 150 carried fixedly by the macihne frame. The upper end of the rod 150 is positioned so that it is contacted by the adjacent surface of the arm 116, the arm being held yieldingly against the rod 150 through the action of the spring 138 on the rod 134. On the contrary, when the treadle is depressed, the slotted end of the bell crank lever 120 is moved downwardly because of the contact of the collar 140 (on the treadle rod 134) with said slotted end, with the result that the arm 116 and the shaft 38 are swung toward the right in Fig. 1, thus bringing the feed roll 36 into contact with a piece of work on the tool 6.

Figure 5:
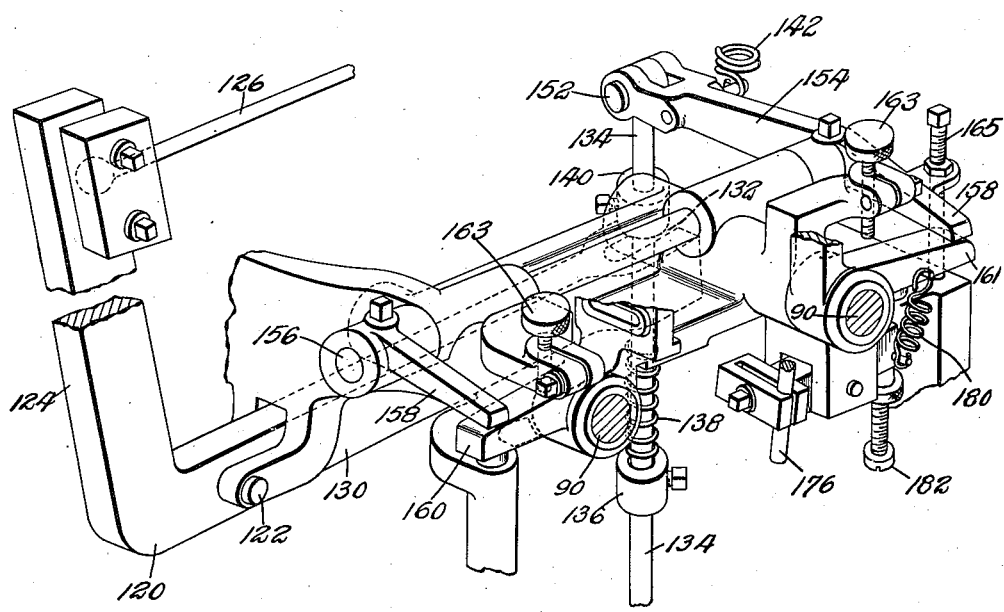
Fig. 5 is a detail of treadle controlled means for securing proper operation of the work feeding and positioning means.

As before stated, the rotary presser members 30 are also mounted to move between work receiving and work pressing positions through treadle operated means involving the same treadle rod 134. As shown in Fig. 5, the treadle rod 134 is pivotally connected at its upper end by a pin 152 to a lever arm 154 secured fixedly to a shaft 156. For maintaining the lever arm 154 and the rod 134 yieldingly in the position shown in Fig. 5, there is provided the stout spring 142, already referred to, which is attached to said arm 154 and also to a stud (not shown) on the machine frame. Also secured to said shaft 156 substantially at each end thereof are lever arms 158, the arm 158 at the right in Figs. 3 and 5 being an extension of lever 154. At its outer end each lever arm 158 presses upon a second lever arm 160 or 161. As shown most clearly in Fig. 3, the lever arms 160, 161 are each pressed upwardly by a spring pressed plunger 162 each slidably carried in a socket in the machine frame. Hence, when the treadle is depressed, thus lifting the free ends of the lever arms 158, the lever arms 160 and 161 are projected upwardly by the spring pressed plungers 162, thus swinging the supports 33 toward each other about their pivots on the shafts 90, whereby the rotary presser members 30 are caused to engage the work piece 5. To limit movement of the supports toward each other under pressure of the plungers 162, there are provided the adjustable stops 163. It will be understood that depression of the treadle rod 134 relieves the pressure on the lever arms 160 and 161 exerted by the lever arms 158, respectively, and, therefore, that the spring pressed plungers 162 are allowed to press the rotary presser members 30 yieldingly into contact with the work piece. On the contrary, release of the treadle rod 134 results in upward movement of the lever arm 154 under action of the stout spring 142, with the result that the supports 33 for the shafts 32 are swung away from each other, thus separating the rotary presser members 30 whereby introduction of a work piece is facilitated. To limit upward movement of the lever 154 by spring 142, the lever arm 158 (in line with lever 154) carries a stop screw 165 (Figs. 3 and 5).

Carried by the supports 33 are curved sheet material guards 164, shown broken away, which are arranged to flare outwardly away from each other to guide the hand of the operator while introducing and manipulating a work piece and to protect the hand against accidental contact with moving parts such as the gears 96.

In the illustrated construction, the right support 33 (Fig. 3) has a downward extension 170 which is slotted to receive a block 172 pivotally mounted at 174 in said extension 170. In the left end of said block 172 (Fig. 3), there is clamped a bar 176 which extends upwardly back of the support 33 and carries fixedly secured thereto the shank 42 of the presser member 40, an intermediate portion of the shank 42 being pressed upon by the set screw 44 to vary the pressure of the presser member 40 upon the work piece, as before described. To secure greater freedom for manipulation of the presser member 40, the other end of the block 172 is connected by a spring 180 to the lever arm 161 and a set screw 182 is adjustably mounted in said end of the block 172 to predetermine the extreme position of the presser member 40 toward the left in Fig. 3.

Means is provided for moving the searing tool 50 into and out of contact with a work piece in position on the tool 6. Upon reference to Fig. 1, it will be observed that the searing tool 50 is carried by a block 181 which carries also suitable channels for a pair of insulated wires 183 by means of which an electrical current is conducted to the tool to heat the latter, preferably to a white heat. As shown, the block 181 is carried by an arm 184 pivoted upon a bearing 186 projecting from the machine frame, the weight of the block and of the arm being such as to hold the arm against a curved stop member 188, the latter being adjustably mounted in a block 190 secured to, or integral with, the adjacent support 33 for the shaft 32. When the shaft 32 and the support 33 on that side are rocked about the center 98 in a direction away from the plane defined by the edge 10 of the tool 6, the block 181 and its supporting arm 184 are rocked in a clockwise direction (Fig. 1) about the bearing 186, the result being that the searing tool 50 is moved away from the tool 6 at the same time that the rotary presser members 30 are moved away from the tool 6 into a work receiving position. On the contrary, when the presser members 30, together with their supports 33, are moved toward each other and into work engaging position, the searing tool 50 is also moved to such position that it contacts the channeled member to operate on the latter simultaneously with the application of adhesive thereto.

In operating the illustrated machine, a work piece such as a channeled insole 5 is presented to the tool 6 while the presser members 30, the feed roll 36, and the searing tool 50 are all in open or work receiving position.

Since the work piece will be fed in an upward direction, it is introduced with all or the greater part of the work piece below the upper faces of the presser members 30. In the case of a channeled insole, the channel does not extend completely to the heel end of the sole and hence the insole is introduced with the unchanneled part above the upper faces of the presser members 30 and with the tool 6 seated deeply into the channel between the channel flaps, as indicated in Fig. 2. Upon depressing the treadle (not shown) the presser members 30 move to the positions shown in Fig. 3 and at the same time the feed roll 36 moves to its operative position to press the adjacent flap against the tool 6, these movements of the elements 30, 36 being accomplished by inward movement of the electrically heated searing tool 50, the engagement of all of these elements with the work taking place substantially simultaneously. The result is that the insole 5 is fed in an upward direction through the co-operation of the roll 36 and the tool 6 while at the same time the presser members 30 operate to hold the insole pressed against the tool so that the latter continues to be forced into the deepest part of the channel. As the insole reaches the toe part, the operator may assist the feeding operation by turning the insole toward himself so as to go around the toe in the cement applying operation. When the insole has been progressed far enough so that the operation is upon the side edge of the insole again, the direction of feed will again be upwardly and the operation will need little or no assistance from the operator. At the end of the treatment of the insole, the operator releases the treadle with the result that the presser members 30, the feed roll 36, and the searing tool 50 return to open or inoperative positions ready for the introduction of another piece of work. The sole which has just been treated has had cement applied to the inner or contiguous surfaces of the channel flaps and at the same time the larger flap of the insole has been seared along a line closely adjacent to the root or apex of the channel in such insole with the result that such channel flap is caused to bend or stand away from the other channel flap thereby obviating any likelihood of the two flaps becoming adhered to each other at this stage at the treatment of the insole.

Having described my invention, what I claim as new and desire to secure by Letters Patent of the United States is:

1. In a machine for applying adhesive to a leather channeled sole having a flap at one side of the channel, means for applying adhesive in said channel, and means applied directly to the outer surface of the flap to cause it to curl away from the other side of the channel.

2. In a machine for treating leather channeled soles having a flap at one side of the channel, means for shrinking the outer surface of said flap to draw it away from the other side of the channel, and means for presenting the flap of a sole progressively to said shrinking means.

3. In a machine for treating a leather sole provided with a channel adjacent to its periphery and having one side of the channel formed by a flexible flap, a searing tool arranged to operate on said flap, and means for feeding said sole to present the flap to the searing tool whereby the flap may be caused to draw away from the other side of the channel.

4. In a machine for treating a leather sole provided with a channel adjacent to its periphery and having one side of the channel formed by a flexible flap, a searing tool arranged to operate on said flap, and means for feeding said sole to present the flap to the searing tool whereby the flap may be caused to draw away from the other side of the channel, said feeding means having a portion engaging the bottom of the channel.

5. In a machine for treating channeled leather soles having one side of the channel formed by a flexible flap, a rotary member provided with a wedge shaped periphery adapted to enter said channel and support said flap, sole feeding means co-operating with said rotary member, and a searing tool acting upon the flap as it is supported by said wedge shaped periphery.

6. In a machine for applying adhesive material to a leather channeled sole, an applying tool operative to enter the channel and apply adhesive to the inner contiguous surfaces of the channel, and a heated tool to sear the sole adjacent to a channel flap whereby the latter stands away from the sole so as not to adhere thereto.

7. In a machine for applying adhesive material to a leather channeled sole, an applying tool operative to enter the channel and apply adhesive to the inner contiguous surfaces of the channel, and an electrically heated tool operative simultaneously with the application of adhesive in the channel to sear the sole on one surface thereof whereby the flap on that side of the sole stands away from the sole so as not to adhere thereto.

8. In a machine for applying adhesive material to a leather channeled sole, an applying tool operative to enter the channel and apply adhesive to the inner contiguous surfaces of the channel, means for feeding the sole during the application of adhesive by said tool, and a heated tool for searing the sole on one surface thereof adjacent to the root of the channel in the sole during movement of the sole by said feeding means whereby the searing of the sole takes place simultaneously with the application of adhesive in the channel thereof.

9. In a machine for applying adhesive material to contiguous surfaces of the channel of a sole, a rotary tool having a firm surface adapted to receive adhesive and apply it to said channel surfaces, a roll arranged to engage a marginal portion of the sole and to press it against said firm adhesive carrying surface of the rotary tool to effect feeding of the sole during the application of said adhesive material, and a presser member for holding a channel flap against the other surface of the rotary tool for the application of adhesive thereto.

10. In a machine for applying adhesive material to contiguous surfaces of a channeled work piece, a rotary tool adapted to receive adhesive and apply it to said surfaces, a roll arranged to co-operate with the rotary tool in feeding the work piece during the application of said adhesive material, and means for pressing the work piece continuously in a direction toward the axis of the rotary tool and against the periphery of said tool throughout the adhesive applying operation.

11. In a machine for applying adhesive material to contiguous surfaces of a channeled work piece, a rotary tool having oppositely directed frusto-conical surfaces and a relatively sharp peripheral portion adapted to receive adhesive on said conical surfaces and apply it to said work piece surfaces, a roll arranged to co-operate with the rotary tool in feeding the work piece at a uniform rate during the application of said adhesive material, and means frictionally engaging the work piece and operative to press the latter continuously toward both adhesive applying conical surfaces of the tool throughout the adhesive applying operation.

12. In a machine for applying adhesive material to contiguous surfaces of a channeled work piece, a rotary tool including oppositely directed frusto-conical members and a disk between said members and of greater diameter than the latter, the arrangement being such that no adhesive is applied to the periphery of said disk and said conical surfaces being adapted to receive adhesive and apply it to said contiguous surfaces of the work piece, and means arranged to co-operate with the rotary tool in feeding the work piece, the periphery of said disk to which no adhesive is applied being receivable in the deepest portion or apex of the channel in the work piece to locate the latter with respect to the adhesive applying conical surfaces of the tool.

13. In a machine for applying adhesive material to contiguous surfaces of a channeled work piece, a rotary tool including oppositely directed frusto-conical members and a disk between said members and of greater diameter than the latter, the arrangement being such that no adhesive is applied to the periphery of said disk and said conical surfaces being adapted to receive adhesive and apply it to said contiguous surfaces of the work piece, means arranged to co-operate with the rotary tool in feeding the work piece, the periphery of said disk to which no adhesive is applied being receivable in the deepest portion or apex of the channel in the work piece to locate the latter with respect to the adhesive applying conical surfaces of the tool, and means for pressing the work piece continuously against the periphery of the disk part of the adhesive applying tool throughout the adhesive applying operation.

14. In a machine for applying adhesive material to contiguous surfaces of a channeled work piece, a rotary tool including oppositely directed frusto-conical members, said conical surfaces being adapted to receive adhesive and apply it to said contiguous surfaces on the work piece, a roll arranged to co-operate with the rotary tool in feeding the work piece at a uniform rate during the application of said adhesive material, the periphery of the tool being receivable in the deepest portion or apex of the channel in the work piece to locate the latter with respect to the adhesive applying conical surfaces of the tool, and means frictionally engaging the work piece at one side of the channeled portion and operative to press the work piece continuously against the periphery of the applying tool throughout the adhesive applying operation.

15. A machine according to claim 14 in which means is provided to engage the channeled portions of the work piece to press the said contiguous surfaces against the adhesive carrying surfaces on the rotary tool.

16. In a machine for applying adhesive material to contiguous surfaces of a channeled work piece, a tool having oppositely facing surfaces adapted to receive adhesive and apply it to said contiguous surfaces, said tool having an edge portion projecting beyond said adhesive carrying surfaces, means comprising a driven roll to feed the work piece during the application of said adhesive material, and a pair of rotary presser members arranged to engage opposite surfaces of the work piece at one side of the channeled portion thereof to press the work piece continuously against the said edge portion of said adhesive applying tool throughout the application of adhesive to said work piece.

17. In a machine for applying adhesive material to one of the inner contiguous surfaces of a channeled work piece, a rotary tool adapted to receive adhesive and apply it to said surface, means to feed the work piece during the application of said adhesive material, a shaft for driving said tool, and a pair of rotary presser members arranged to engage opposite surfaces of the work piece and to rotate toward the axis of the rotary tool to press the work piece against said tool.

18. In a machine for applying adhesive material to one of the inner contiguous surfaces of a channeled work piece, a rotary disk-like tool adapted to receive adhesive and apply it to said surfaces, a roll arranged to co-operate with the rotary tool in feeding the work piece during the application of said adhesive material, and a pair of rotary presser members arranged to engage opposite surfaces of the work piece to press the latter continuously against the peripheral edge of said rotary tool throughout the application of adhesive to said work piece.

19. In a machine for applying adhesive material to contiguous surfaces of a work piece, a rotary tool adapted to receive adhesive and apply it to said surfaces, means to feed the work piece during the application of said adhesive material, a substantially horizontal shaft for driving said tool, a pair of rotary presser members arranged to engage frictionally opposite surfaces of the work piece to press the latter against said tool, and a pair of shafts, one for each rotary presser member to drive the latter, the axis of each shaft being arranged to extend in a direction to cross the shaft of the rotary tool at a substantial angle.

20. In a machine for applying adhesive material to contiguous surfaces of a work piece, a tool adapted to receive adhesive and apply it to said surfaces, means arranged to co-operate with the tool in feeding the work piece during the application of said adhesive material, a pair of rotary presser members arranged to engage opposite surfaces of the work piece to press the latter continuously against the adhesive applying tool throughout the application of adhesive to said work piece, a pair of shafts each carrying one of said rotary presser members, supports for said shafts, spring means for yieldingly urging the supports and the presser members carried thereby toward each other, whereby the work piece is yieldingly engaged by said rotary presser members, and means for moving the supports and also the presser members away from each other to facilitate introduction of the work piece with respect to said tool.

21. In a machine for applying adhesive material to contiguous surfaces of a work piece, a rotary tool adapted to receive adhesive and apply it to said surfaces, a driven roll arranged to co-operate with the rotary tool in feeding the work piece at a uniform rate during the application of said adhesive material, a pair of rotary presser members arranged to engage opposite surfaces of the work piece to press the latter continuously against the rotary tool throughout the application of adhesive to said work piece, a pair of shafts each carrying one of said rotary presser members, supports for said shafts, spring means for yieldingly urging the supports and the presser members carried thereby toward each other, whereby the work piece is yieldingly engaged by said rotary presser members, means for yieldingly pressing the driven feed roll toward the adhesive applying tool, and manually operable means for moving said driven roll and also both of the rotary presser members away from operative position so as to facilitate introduction of the work piece into engaging position with the adhesive applying tool.

22. In a machine for applying adhesive material to contiguous surfaces of a channeled work piece, a rotary disk-like tool adapted to receive adhesive and apply it to said surfaces, means to feed the work piece during the application of said adhesive material, a pair of presser members arranged to engage opposite surfaces of the work piece and to rotate toward the axis of said tool constantly to press the work piece against the periphery of the adhesive applying tool, and means for engaging opposite surfaces of the channeled portion of the work piece for pressing such portions against the adhesive carrying surfaces of the tool to insure transfer of adhesive from the tool to said contiguous surfaces of the work piece.

23. In a machine for applying adhesive material to contiguous surfaces of a channeled work piece, a rotary disk-like tool adapted to receive adhesive and apply it to said surfaces, a driven roll arranged to co-operate with the rotary tool in feeding the work piece at a uniform rate during the application of said adhesive material, a pair of presser members arranged to engage opposite surfaces of the work piece and to rotate toward the axis of said tool constantly to press the work piece against the periphery of adhesive applying tool, and a spring pressed member to press one portion of the work piece against an adhesive carrying surface of said tool, the driven feeding roll serving also as a presser member to press another portion of the work piece against another adhesive carrying surface of said tool.

24. In a machine for applying adhesive material to contiguous surfaces of a channeled work piece, a rotary disk-like tool adapted to receive adhesive and apply it to said surfaces, a driven roll arranged to co-operate with the rotary tool in feeding the work piece during the application of said adhesive material, a pair of rotary presser members arranged to engage opposite surfaces of the work piece and to rotate toward the axis of said tool constantly to press the work piece against the periphery of the adhesive applying tool, means for engaging opposite surfaces of the work piece to press portions of the latter against the adhesive carrying surfaces of the tool to insure transfer of adhesive from the tool to contiguous surfaces of the work piece, supports for the rotary presser members and for said pressing means, and spring means for yieldingly pressing said supports toward each other whereby the rotary presser members and said pressing means are caused yieldingly to engage the work piece.

25. A machine according to claim 24 characterized by the fact that manually operable means is provided for moving said supports away from each other against the resistance of said spring means to facilitate introduction of a work piece into engagement with said adhesive applying tool.

26. In a machine for applying adhesive material to inner contiguous surfaces of a channeled work piece, a rotary tool having a wedge-shaped surface adapted to receive adhesive and apply it to said surfaces, a roll arranged to co-operate with the rotary tool in feeding the work piece during the application of said adhesive material, means tending constantly to press the work piece against the wedge-shaped surface of the adhesive-applying tool, members including said roll for engaging opposite surfaces of the work piece for pressing portions of the latter against the adhesive-carrying surfaces of the tool to insure transfer of the adhesive from the tool to the work piece, supports for said pressing members, spring means for moving the supports and the pressing members carried thereby on opposite sides of the tool toward each other yieldingly to press on the work piece, and manually controlled means for moving said supports away from each other to facilitate introduction of the work piece.

27. In a machine for applying adhesive material to inner contiguous surfaces of a channeled work piece, a rotary tool adapted to receive adhesive and apply it to said surfaces, a driven roll arranged to co-operate with the rotary tool in feeding the work piece during the application of said adhesive material, means tending constantly to press the work piece against the periphery of the adhesive applying tool, said driven roll being arranged to engage one surface of the work piece for pressing a portion of the latter against one of the adhesive carrying surfaces of the tool to insure transfer of the adhesive from the tool to the work piece, a flat spring member to press on another portion of the work piece to hold it against the other adhesive carrying surface of said tool, supports for the driven roll and for the flat spring member movable away from each other thereby to space the roll and member from each other to facilitate introduction of the work piece, and spring means operating on said supports to press the driven roll and the flat presser member yieldingly against opposite sides of the work piece.

28. In a machine for applying adhesive material to the inner contiguous surfaces of a channeled work piece, a rotary tool adapted to receive adhesive and apply it to said surfaces, a roll arranged to co-operate with the rotary tool in feeding the work piece during the application of said adhesive material, members including said roll arranged to engage opposite surfaces of the channeled portions of the work piece for pressing such portions against the adhesive carrying surfaces of the tool to insure transfer of the adhesive from the tool to the work piece, a searing tool, a support for the latter, means for moving the searing tool and its support yieldingly into operative position to sear the work piece at the same time that adhesive is being applied thereto, and means for moving the searing tool and the said pressing members away from the central plane of the tool to facilitate introduction of the work piece into operative relation with respect to the tool.

29. In a machine for applying adhesive material to the inner contiguous surfaces of a channeled work piece, a rotary tool adapted to receive adhesive and apply it to said surfaces, a roll arranged to co-operate with the rotary tool in feeding the work piece during the application of said adhesive material, a pair of presser members tending constantly to press the work piece against the adhesive applying tool to keep the latter inserted fully into the channel of the work piece, supports for the presser members, spring means operative to move the supports toward each other to cause the presser members to engage opposite surfaces of the work piece, a tool to sear the work piece at the same time that adhesive is applied to another portion thereof, a support for said tool, spring means for pressing said tool and its support into operative relation to the work piece, means to move the presser members and the searing tool away from operative position, thereby to facilitate introduction of the work piece.

30. In a machine for applying adhesive material to contiguous surfaces of a work piece, a rotary tool adapted to receive adhesive and apply it to said surfaces, a roll arranged to co-operate with the rotary tool in feeding the work piece during the application of said adhesive material, a pair of rotary presser members operative constantly to press the work piece against the periphery of the adhesive applying tool, means for engaging opposite surfaces of the channeled portion of the work piece for pressing portions of the latter against the adhesive-carrying surfaces of the tool to insure transfer of the adhesive from the tool to inner contiguous surfaces of the channeled portion of the work piece, a pair of positively driven shafts, one for each rotary presser member, supports for the shafts movable toward and from each other to move the presser members between work receiving and work pressing positions, spring means urging said supports toward each other, and manually controlled means to move the supports away from each other against the pressure of said spring means, whereby upon release of said manually-controlled means the supports and the presser members carried thereby are pressed into yielding engagement with the work piece.

31. In a machine for applying adhesive material to contiguous surfaces of a work piece, a rotary disk-like tool adapted to receive adhesive and apply it to said surfaces, a roll arranged to co-operate with the rotary tool in feeding the work piece during the application of said adhesive material, a pair of rotary presser members tending constantly to press the work piece against the periphery of the rotary tool, means to engage opposite surfaces of the channeled portion of the work piece for pressing portions of the latter against the adhesive-carrying side surfaces of the tool to insure transfer of the adhesive from the tool to the work piece, a pair of positively driven shafts, one for each rotary presser member, supports for the shafts movable toward and from each other to move the presser members between work receiving and work pressing positions, spring means urging said supports toward each other, supports for said pressing means, spring means for moving the supports for the pressing means on opposite sides of the tool toward each other yieldingly to press on the channeled portions of the work piece, and manually controlled means for moving the supports for both the presser members and for the pressing means away from each other on opposite sides of the rotary disk-like tool to facilitate introduction of the work piece.

32. In a machine for applying adhesive material to contiguous surfaces of a work piece, a rotary tool adapted to receive adhesive and apply it to said surfaces, a roll arranged to co-operate with the rotary tool in feeding the work piece at a uniform rate during the application of said adhesive material, a pair of presser members tending constantly to press the work piece against the periphery of the rotary tool, shafts for driving said rotary presser members, supports for said shafts movable toward and from each other to carry the presser members toward and away from work pressing position, a flat spring member to press on one portion of the work piece to hold it against an adhesive-carrying surface of said tool, connections between said flat presser member and one of said supports to secure movement of the flat presser member simultaneously with one of the rotary presser members, treadle controlled means for moving the supports away from each other thereby to space the rotary presser members from each other to facilitate introduction of the work piece. and spring means operating on said supports to press the rotary presser members yieldingly against opposite sides of the work piece.

33. In a machine for applying adhesive material to contiguous surfaces of a channeled leather shoe part, a rotary disk-like tool adapted to receive adhesive and apply it to said surfaces, means to feed the shoe part at a uniform rate during the application of said adhesive material, a pair of rotary presser members tending constantly to press the shoe part against the periphery of the rotary tool, means to engage opposite surfaces of the channeled portion of the shoe part for pressing said portions against the oppositely facing adhesive-carrying side surfaces of the tool to insure transfer of the adhesive from the tool to contiguous surfaces on the shoe part, supports for said rotary presser members, spring means urging said supports toward each other whereby the rotary presser members are caused to engage the shoe part yieldingly, supports for the pressing means opposite the side surfaces of the tool, a searing tool, a support for the latter, spring means for moving the searing tool into operative position to sear the shoe part at the same time that adhesive is being applied thereto, and manually controlled means for moving said supports for both the rotary presser members and said pressing means and also the support for the searing tool away from the central plane of the rotary tool to facilitate introduction of the shoe part into operative relation with respect to the tool.

34. In a machine for applying adhesive material to contiguous surfaces of a channeled leather shoe part, a rotary disk-like tool adapted to receive adhesive and apply it to said surfaces, a power driven roll arranged to cooperate with the rotary tool in feeding the shoe part at a uniform rate during the application of said adhesive material, a pair of rotary presser members tending constantly to press the work piece against the periphery of the adhesive-applying tool, means including said driven roll arranged to engage opposite surfaces of the channeled portion of the shoe part for pressing portions of the latter against the adhesive-carrying side surfaces of the disk-shaped tool to insure transfer of the adhesive from the tool to contiguous surfaces of the shoe part, supports for the rotary presser members, spring means operative to move the supports toward each other to cause the rotary presser members to engage opposite surfaces of the work piece, said power driven feed roll being movable from a spaced position with respect to the rotary tool to a position where it engages the shoe part to press a part of the latter against an adhesive carrying surface of the rotary tool, spring means to press said driven roll against the shoe part and tool, a searing tool comprising an electrically heated wire to sear the shoe part while adhesive is applied to another portion thereof, a support for said searing tool, spring means for pressing the support and searing tool into operative relation to the work piece, and a manually operable means to move the rotary presser members, the feed roll and the searing tool away from operative position, thereby to facilitate introduction of the work piece.

CHARLES G. BROSTROM.